(12) United States Patent
Reddy et al.

(10) Patent No.: US 9,760,800 B2
(45) Date of Patent: Sep. 12, 2017

(54) METHOD AND SYSTEM TO DETECT OBJECTS USING BLOCK BASED HISTOGRAM OF ORIENTED GRADIENTS

(71) Applicant: Tata Consultancy Services Limited, Mumbai (IN)

(72) Inventors: Pratap Pulugoru Reddy, Bangalore (IN); Nanikimar Kancharla, Bangalore (IN); Niranjana Arumugam, Bangalore (IN); Rahul Kumar Singh, Bangalore (IN); Karthika Kumaran, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/069,469

(22) Filed: Mar. 14, 2016

(65) Prior Publication Data

US 2017/0169309 A1   Jun. 15, 2017

(30) Foreign Application Priority Data

Dec. 14, 2015   (IN) .......................... 4688/MUM/2015

(51) Int. Cl.
*G06K 9/00* (2006.01)
*G06K 9/62* (2006.01)
*G06F 13/28* (2006.01)

(52) U.S. Cl.
CPC ........... *G06K 9/6212* (2013.01); *G06F 13/28* (2013.01); *G06K 9/00818* (2013.01); *G06K 9/6263* (2013.01)

(58) Field of Classification Search
CPC ............ G06K 9/6212; G06K 9/00818; G06K 9/6263; G06F 13/28
See application file for complete search history.

(56) References Cited

U.S. PATENT DOCUMENTS

2011/0255743 A1   10/2011   Guan et al.
2014/0369561 A1   12/2014   Gupta et al.
(Continued)

OTHER PUBLICATIONS

Banu et al., "Video Based Vehicle Detection Using Morphological Operation and Hog Feature Extraction", ARPN Journal of Engineering and Applied Sciences, Asian Research Publishing Network (ARPN), Vol. 10, No. 4, pp. 1866-1871, (2015).
(Continued)

*Primary Examiner* — Phuoc Tran
(74) *Attorney, Agent, or Firm* — Finnegan, Henderson, Farabow, Garrett & Dunner LLP

(57) ABSTRACT

A processor-implemented method and system for detecting objects in a media file using a block based histogram of oriented gradients methodology is described. At least one image representing at least one frame of a video sequence comprising one or more objects of at least one desired object type is received. A region of interest contained in a block of frame is considered. An array containing magnitude and angle values is calculated, normalized for each pixel in the block in the internal memory. The normalized array is aggregated, ported and stored in an external memory. A value or block of values of the aggregated array in the external memory along with the specific feature vector is transferred to the internal memory. Based on a comparison of each value in the aggregated array and the specific feature vector, a desired object type is detected.

20 Claims, 3 Drawing Sheets

(56) References Cited

U.S. PATENT DOCUMENTS

2015/0294174 A1* 10/2015 Karkowski ............ G06K 9/325
                                                        382/182
2015/0310615 A1* 10/2015 Bulan ................ H04N 5/23229
                                                        348/143
2017/0091575 A1*  3/2017 Lee ......................... G06K 9/42

OTHER PUBLICATIONS

He et al., "Human Detection Using Mobile Embedded Smart Cameras", Faculty Publications from the Department of Electrical Engineering. Paper 206, University of Nebraska—Lincoln, IEEE International Conference on Distributed Smart Cameras (ICDSC), 7 pages, (2011).

Zheng et al., "A High-Performance Computing Toolset for Relatedness and Principal Component Analysis of SNP Data", Bioinformatics Advance Access, Oxford University Press, pp. 1-3, (2012).

* cited by examiner

METHOD AND SYSTEM TO DETECT OBJECTS USING BLOCK BASED HISTOGRAM OF ORIENTED GRADIENTS

PRIORITY CLAIM

This U.S. patent application claims priority under 35 U.S.C. §119 to: India Application No. 4688/MUM/2015, filed on 14 Dec. 2015. The entire contents of the aforementioned application are incorporated herein by reference.

TECHNICAL FIELD

The embodiments herein generally relate to image processing system and method to detect objects in media files using a block based histogram of gradients.

BACKGROUND

Object detection systems have increased attention in the recent past owing to numerous applications in the field of auto navigation. It is a common observation that conventional object detection systems and methods require a comparatively greater amount of computing resources. In addition to utilizing relatively higher amount of computing resources, conventional object detection systems tend to have slow detection speeds. Object detection speed is of paramount importance in this technical field. In most scenarios, the driver of a vehicle has to take a decision in a fraction of a second. In such scenarios, it is a long felt need that systems have to detect and notify specific objects almost instantaneously by using fewer computing resources. Images are captured by the sensor and the object to be detected in the region of interest in the said image is determined through numerous methodologies. These systems can easily be plugged into vehicle electronics.

Traffic sign detection is integral to advanced driver assistance systems (ADAS). In the context of ADAS, in certain embodiments, in addition to regulation of traffic, traffic signs also indicate the condition and state of the road. Drivers and pedestrians alike can make use of these alert mechanisms when traveling on the road associated with the traffic signs. Faster detection of entities such as traffic signs, vehicles, animals and the like will allow more time for course correction.

The Histogram of Oriented Gradients (HOG) is a feature descriptor used in image processing for the purpose of object detection. It is a generic technique used in detecting objects, specifically vehicles in the images/video sequence. Conventional systems implement Histogram of Oriented Gradients methodology in software and are characterized by low speed of operation. In some embodiments, conventional object detections systems operate on Field Programmable Gate Arrays (FGPA) in order to achieve real time performance in detecting the vehicles. However, this conventional implementation on FGPA renders the system inflexible and is not amenable to integration with vehicle electronics.

SUMMARY

The following presents a simplified summary of some embodiments of the disclosure in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

In one aspect, a processor-implemented method is provided. The processor implemented method comprising receiving, by a hardware processor, at least one image representing at least one frame of a video sequence comprising one or more objects of at least one desired object type; extracting, by the hardware processor, one or more blocks from the frame, wherein each of one or more blocks comprises at least one region of interest in the frame; calculating magnitude and angle values for every pixel in at least one region of interest in one or more blocks; storing magnitude and angle values in a first memory device; converting magnitude and angle values into an array; normalizing one or more arrays to obtain a set of normalized arrays and porting the set of normalized arrays in a second memory device to obtain an aggregated array; performing, in the first memory device, a comparison of (i) each value in the aggregated array in the second memory device with (ii) a specific feature vector obtained from the second memory device; and detecting an object based on the comparison. The desired object type is one of a variety of forms including, but not limited to, a traffic sign, a vehicle, a pedestrian, an animal. The first memory device is an internal memory. The magnitude is stored in a first buffer of the first memory device, and the angles are stored in a second buffer of the first memory device. The array is normalized to obtain normalized array using a histogram of gradients methodology with block based approach. The second memory device is an external memory. An orientation of one or more blocks is vertical. In one aspect, a block of the aggregated array and specific feature vector is ported to the first memory device by direct memory access (DMA). The step of detecting the object based on the comparison comprises estimating a difference based on the comparison; and detecting the object when the difference is greater than a predetermined threshold.

In another aspect, information processing system for detecting objects in a digital image, the information processing system comprising a first memory device; a second memory device; a hardware processor communicatively coupled to the first memory device and the second memory device, wherein the hardware processor is configured by instructions to receive at least one image representing at least one frame of a video sequence comprising one or more objects of at least one desired object type by a hardware processor; extract one or more blocks from the frame, wherein each of one or more blocks correspond to at least one region of interest in the frame by the hardware processor; calculate magnitude and angle values for every pixel in at least one region of interest; store the magnitude and the angle values in a first memory device; convert the magnitude and angle values into an array; normalize one or more arrays to obtain a set of normalized arrays and porting the set of normalized arrays in a second memory device to obtain an aggregated array in a second memory device; perform, in the first memory device, a comparison of (i) each value in the aggregated array in the second memory device with (ii) a specific feature vector obtained from the second memory device; and detect an object based on the comparison. In one implementation, each value or blocks of values from the aggregated array thereof along with specific feature vector are moved to the internal memory by direct memory access (DMA) for comparison and resultant object detection.

It is to be understood that both the foregoing general description and the following detailed description are exemplary and explanatory only and are not restrictive of the invention, as claimed.

BRIEF DESCRIPTION OF THE DRAWING

The embodiments herein will be better understood from the following detailed description with reference to the drawings, in which.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
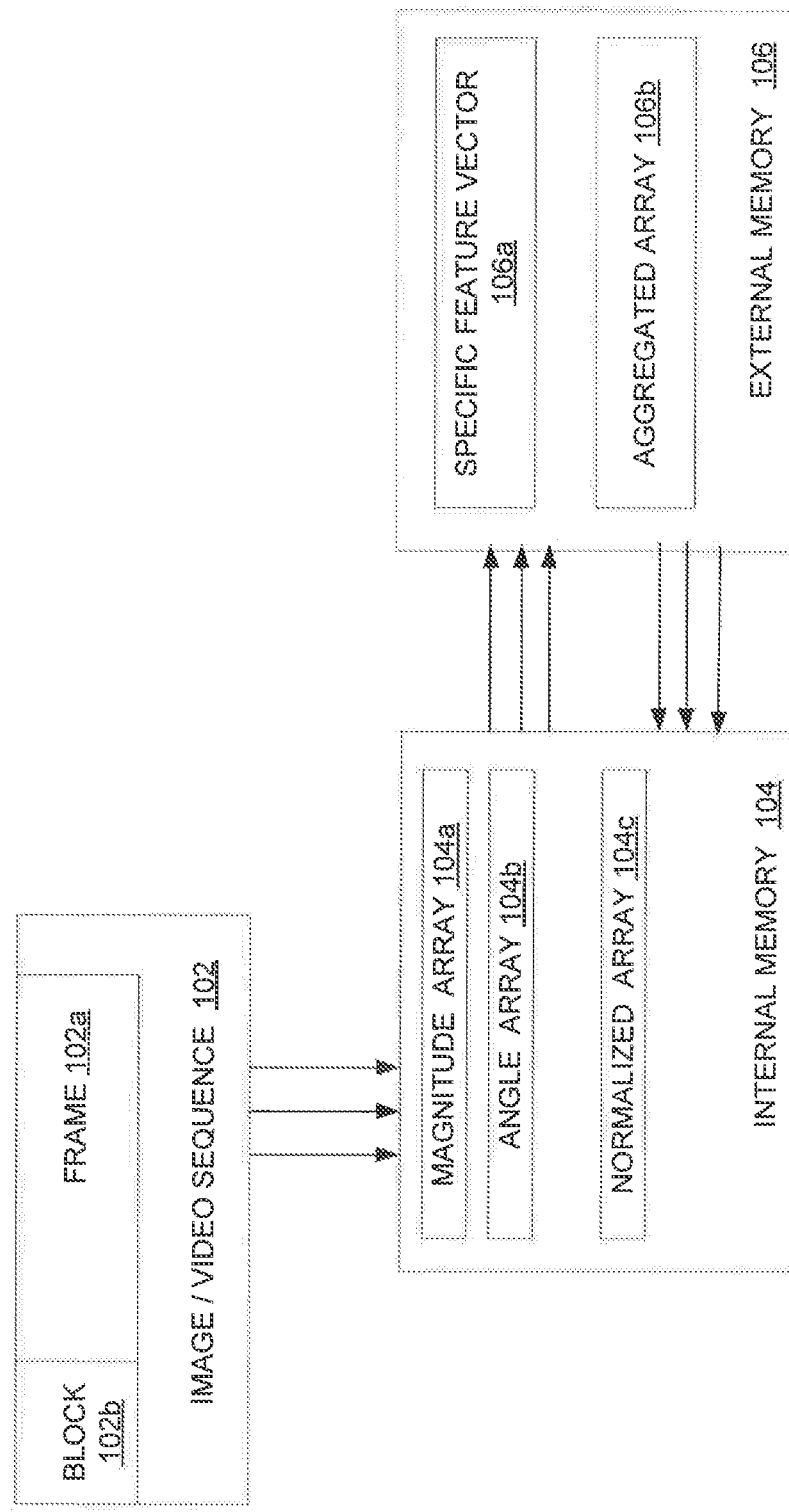
FIG. 1 illustrates a block diagram of a system to detect objects using a block based histogram of oriented gradients methodology, according to an embodiment of the present disclosure.

FIG. 1 illustrates a schematic diagram of an information processing system 100 to detect objects by using block based histogram of oriented gradients methodology according to an embodiment of the present disclosure. The system 100 comprises an image or object sequence captured 102, and frame 102a within the captured image/object sequence. Frame 102a is further divided into a plurality of blocks. One such block 102b is described. The block 102b depicts the region of interest where the desired object including, but is not limited to, at least one of vehicle, traffic signal or human entity is to be detected.

The magnitude and angle values for every pixel in the region of interest in the block 102b is calculated and stored in respective arrays for example, a magnitude array 104a and an angle array 104b in the internal memory 104. The magnitude and angle values are converted into a normalized array 104c and stored in the internal memory 104. The normalized arrays thus obtained for all the pixels are aggregated. The set of normalized arrays are ported to the second memory device. The aggregated array 106b thus obtained by a set of normalized arrays is stored in the second memory device, which is an external memory 106.

The external memory 106 acts as a repository to store the aggregated array 106b and also a specific feature vector 106a. Generally, a feature vector contains a plurality of elements that characterize the generic entity in consideration. According to one embodiment, the entity may represent a pixel or whole object in an image. In another embodiment, the features may include one or more of color components, length, area, circularity, gradient magnitude, gradient direction, or simple the gray-level intensity. In one embodiment, v=[R; G; B] describes a feature vector containing color components of a pixel or image object.

In certain embodiments, trained data sets associated with specific feature vector are generated offline using support vector machine (SVM). Support vector machine refers to supervised learning models with associated learning technique(s) that analyze data and recognize patterns.

Figure 2:
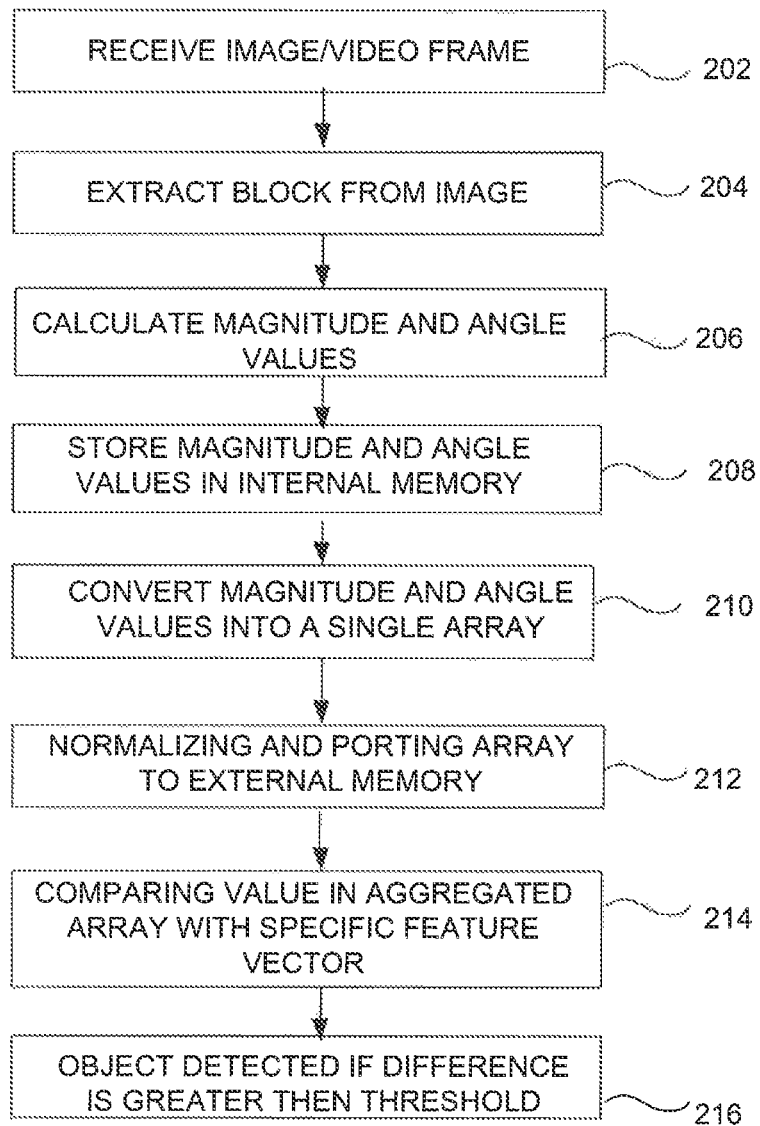
FIG. 2 is a flow diagram illustrating a method to detect objects using a block based histogram of oriented gradients methodology, according to an embodiment of the present disclosure.

FIG. 2, with reference to FIG. 1, is a firm diagram illustrating a method of detecting objects using a block based histogram of oriented gradients implemented by the system 100 of FIG. 1, according to the embodiments as disclosed herein. In step 202, an image or video sequence is captured by an image capturing device. Alternatively, the image or video sequence may be obtained from a data source (e.g., from an external storage device). In one implementation a video of resolution (640*480) pixels is captured. Each frame of the video sequence thus captured is divided into blocks for optimized computation. In step 204, one or more blocks are extracted from the frame. In one embodiment, a block of (16*16) pixels is extracted. One or more blocks thus extracted comprise at least one region of interest where at least one desired object is to be detected. In step 206, the magnitude and angle values of every pixel in one block are calculated. In step 208, the magnitude and angle values of every pixel in one block calculated in Step 206 are stored in the internal memory 104. In one implementation, the gradient and angle values are stored in gradient and angle buffers of type short and unsigned char respectively. The gradient and angle buffers reside in the internal memory 104. In conventional methods, gradient and angle calculation for full image happens in a single iteration, whereas the embodiments of the present disclosure proposed a technique, wherein computation is done for all blocks in vertical direction of the image. Owing to the vertical orientation of blocks the buffer size for storing gradient and orientation values in the internal memory 104 is lesser when compared to conventional methods. In step 210, the magnitude and angle values are converted into a single array. In Step 212, the single array is normalized. The normalized array is ported to an external memory device 106. In one implementation, the external memory device 106 is a double data rate (DDR) memory. In step 214, each value or blocks of values of the aggregated array is compared with specific feature vector. In one implementation, each value or blocks of values of the aggregated array and specific feature vector is ported into the internal memory from the external memory by Direct Memory Access (DMA). In step 216, object is detected based on the comparison of the each value or blocks of values of the aggregated array and the specific feature vector. In one embodiment, when the difference between each value or blocks of values of the aggregated array and specific feature vector is above a threshold value then the inference is that the object is detected. Similarly, in another scenario, when the difference between each value or blocks of values of the aggregated array and specific feature vector is below a threshold value then the inference is that the object is not detected.

In yet another implementation, the normalized vector is multiplied with specific feature vector and the output is aggregated. Each value or block of values in the aggregated array is compared with a specific threshold. If the difference is above the threshold value, then the inference is that object is detected. If the difference is below threshold value, then the inference is that the object is not detected.

Figure 3:
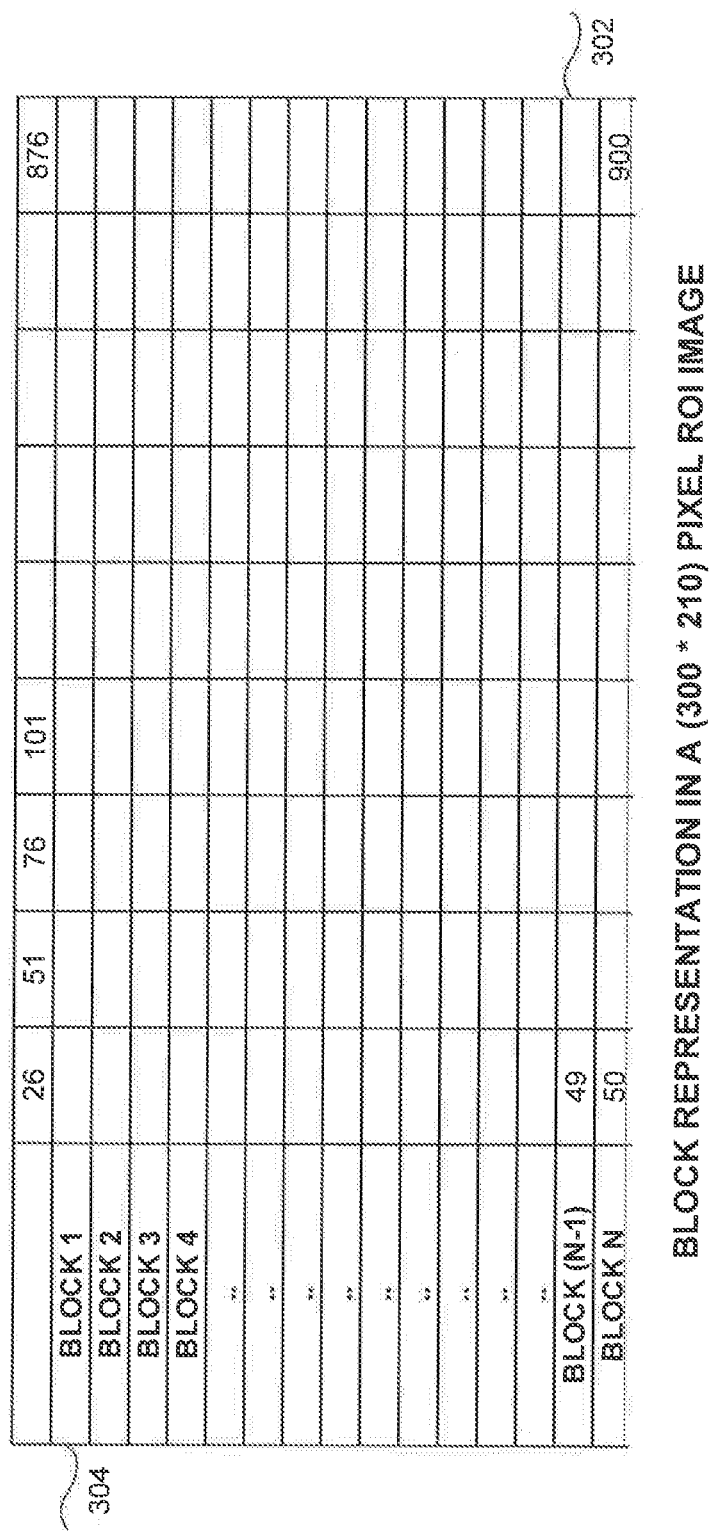
FIG. 3 shows one example of block representation in a region of interest in a frame, according to an embodiment of the present disclosure.

FIG. 3 depicts this illustrative example of block representation in a region of interest of (300*210) pixels in a frame, according to an embodiment of the present disclosure. According to one embodiment, a media file is considered. A frame measuring (640*480) is extracted from the media file. In one example embodiment, a portion of the frame measuring (300*210) pixels is designated as the region of interest (ROI) 302. A block 304 of size (16*16) pixels is marked out for consideration in block based histogram of oriented gradient approach. The width of ROI 302 in this case is 300 and overlapped pixels are 8 in number in one of the embodiments. Further, number of horizontal blocks is computed by adding one to a ratio of (i) the difference between the width of region of interest and width of a representative block and (ii) number of overlapped pixels of consecutive blocks considered for object detection. Furthermore, number of vertical blocks is computed by adding one to a ratio of (i) the difference between the height of region of interest and height of a representative block and (ii) number of overlapped pixels of consecutive blocks considered for object detection.

Number of horizontal or vertical blocks can be determined by the equation presented herein Number of horizontal blocks=(Width of ROI−width of the representative block/overlapped pixels)+1

Number of vertical blocks=(Height of ROI−height of the representative block/overlapped pixels)+1

In one scenario where, width of region of interest is 300 pixels, width of the block is 16 pixels, considering that there are 8 overlapped pixels, the number of horizontal blocks is 36. Similarly, height of region of interest is 210 pixels, height of the block is 16 pixels, considering that there are 8 overlapped pixels, the number of vertical blocks is 36.

(300−16)/8+1=36 blocks (210−16)/8+1=25 blocks.

The above technical methodology of dividing the frame into blocks for the process of histogram normalization facilitates faster processing and objects detection speed. Further, the orientation of blocks in this configuration is vertical. Since, only vertical blocks are considered, the buffer size for storing gradient and angle values are minimal when compared to conventional approach. Minimal buffer size renders it suitable for storage in internal memory. Furthermore, the number of cycles required for computations is also reduced thereby increasing the speed of operation. Since, usage of fewer computing resources leads to optimization of hardware resources in a computer system, thereby resulting in faster processing speed.

It is, however to be understood that the scope of the protection is extended to such a program and in addition to a computer-readable means having a message therein: such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
   receiving, by a hardware processor at least one image representing at least one frame of a video sequence comprising one or more objects of at least one desired object type;
   extracting, by said hardware processor, one or more blocks from said frame, wherein each of said one or more blocks comprises at least one region of interest in said frame;
   calculating magnitude and angle values for every pixel in said at least one region of interest in said one or more blocks;
   storing said magnitude and said angle values corresponding to said one or more blocks in a first memory device;
   converting said magnitude and said angle values corresponding to said one or more blocks into a corresponding array to obtain one or more arrays;
   normalizing said one or more arrays to obtain a set of normalized arrays and porting said set of normalized arrays in a second memory device to obtain an aggregated array;
   performing, in said first memory device, a comparison of (i) each value of said aggregated array obtained from said second memory device with (ii) a specific feature vector obtained from said second memory device; and
   detecting an object based on said comparison.

2. The method as claimed in claim 1, wherein said first memory device is an internal memory.

3. The method as claimed in claim 1, wherein said magnitude is stored in a first buffer of said first memory device, and wherein said angle values are stored in a second buffer of said first memory device.

4. The method as claimed in claim 1, wherein said one or more arrays are normalized to obtain said set of normalized arrays using a histogram of gradients methodology with block based approach.

5. The method as claimed in claim 1, wherein said second memory device is an external memory.

6. The method as claimed in claim 1, wherein an orientation of said one or more blocks is vertical.

7. The method as claimed in claim 1, wherein each value or blocks of values of said aggregated array and said specific feature vector are ported to the said first memory device by direct memory access (DMA).

8. The method as claimed in claim 1, wherein detecting said object based on said comparison comprises estimating a difference based on said comparison; and detecting said object when said difference is greater than a predetermined threshold.

9. An information processing system for detecting objects in a digital image, the information processing system comprising:
   a first memory device;
   a second memory device;
   a hardware processor communicatively coupled to said first memory device and said second memory device, wherein said hardware processor is configured by instructions to:
   receive at least one image representing at least one frame of a video sequence comprising one or more objects of at least one desired object type by a hardware processor;
   extract one or more blocks from said frame, wherein each of said one or more blocks correspond to at least one region of interest in said frame by said hardware processor;
   calculate magnitude and angle values for each pixel in said at least one region of interest;
   store said magnitude and said angle values in a first memory device;
   convert said magnitude and said angle values into an array;
   normalize said one or more arrays to obtain a set of normalized arrays and porting said set of normalized arrays in a second memory device to obtain an aggregated array;
   perform, in said first memory device, a comparison of (i) each value of said aggregated array obtained from said second memory device with a specific feature vector obtained from said second memory device; and
   detect an object based on said comparison.

10. The system as claimed in claim 9, wherein said first memory device is an internal memory.

11. The system as claimed in claim 9, wherein said magnitude is stored in a first buffer of said first memory device, and wherein said angle values are stored in a second buffer of said first memory device.

12. The system as claimed in claim 9, wherein said array is normalized to obtain normalized array using a histogram of gradients methodology with block based approach.

13. The system as claimed in claim 9, wherein said second memory device is an external memory.

14. The system as claimed in claim 9, wherein each value or blocks of values of the said aggregated array and said specific feature vector is ported to the said first memory device by direct memory access (DMA).

15. The system as claimed in claim 9, wherein an orientation of said one or more blocks is vertical.

16. The system as claimed in claim 9, wherein said hardware processor is configured to estimate a difference based on said comparison, and detect said object when said difference is greater than a predetermined threshold.

17. One or more non-transitory machine readable information storage mediums comprising one or more instructions which when executed by one or more hardware processors causes: receiving, by a hardware processor, at least one image representing at least one frame of a video sequence comprising one or more objects of at least one desired object type;

extracting, by said hardware processor, one or more blocks from said frame, wherein each of said one or more blocks comprises at least one region of interest in said frame;

calculating magnitude and angle values for every pixel in said at least one region of interest in said one or more blocks;

storing said magnitude and said angle values corresponding to said one or more blocks in a first memory device;

converting said magnitude and said angle values corresponding to said one or more blocks into a corresponding array to obtain one or more arrays;

normalizing said one or more arrays to obtain a set of normalized arrays and porting said set of normalized arrays in a second memory device to obtain an aggregated array;

performing, in said first memory device, a comparison of (i) each value of said aggregated array obtained from said second memory device with (ii) a specific feature vector obtained from said second memory device; and detecting an object based on said comparison.

18. The one or more non-transitory machine readable information storage mediums of claim 17, wherein said first memory device is an internal memory.

19. The one or more non-transitory machine readable information storage mediums of claim 17, wherein said magnitude is stored in a first buffer of said first memory device, and wherein said angle values are stored in a second buffer of said first memory device.

20. The one or more non-transitory machine readable information storage mediums of claim 17, wherein said one or more arrays are normalized to obtain said set of normalized arrays using a histogram of gradients methodology with block based approach.

\* \* \* \* \*